United States Patent [19]

Bergsma

[11] Patent Number: 5,062,444
[45] Date of Patent: Nov. 5, 1991

[54] FUEL LEVEL RESPONSIVE VAPOR VENT VALVE

[75] Inventor: Rudolph Bergsma, Ann Arbor, Mich.

[73] Assignee: G. T. Products, Inc., Ann Arbor, Mich.

[21] Appl. No.: 609,365

[22] Filed: Nov. 5, 1990

Related U.S. Application Data

[63] Continuation of Ser. No. 419,335, Oct. 10, 1989, abandoned.

[51] Int. Cl.$^5$ ............................................. F16K 31/22
[52] U.S. Cl. .................................... 137/202; 137/432; 137/588
[58] Field of Search ................ 137/202, 432, 192, 588

[56] References Cited

U.S. PATENT DOCUMENTS

| | | | |
|---|---|---|---|
| 2,646,819 | 7/1953 | Lippold | 137/432 |
| 4,376,446 | 3/1983 | Liff | 137/202 |
| 4,679,581 | 7/1987 | Mears | 137/202 X |
| 4,779,637 | 10/1988 | Ubaldi | 137/202 X |

FOREIGN PATENT DOCUMENTS

| | | | |
|---|---|---|---|
| 1000306 | 1/1957 | Fed. Rep. of Germany | 137/202 |
| 1168667 | 9/1958 | France | 137/432 |

Primary Examiner—Alan Cohan
Attorney, Agent, or Firm—Krass & Young

[57] ABSTRACT

A vapor vent valve for venting air and fuel vapor from vehicle fuel tanks comprises a hollow valve body having radial flow ports formed therein, and an axially slidable shutter movable between a valve open position remote from the radial flow ports and a valve closed position covering the radial flow ports. An axially slidable float mounted on the valve body adjacent the shutter lowers and raises the shutter between the valve open and closed positions in response to changes in the tank fuel level. The axial shutter and float structure is unaffected by the radial outflow of air and fuel vapor through the ports.

4 Claims, 3 Drawing Sheets

FUEL LEVEL RESPONSIVE VAPOR VENT VALVE

This is a continuation of U.S. patent application Ser. No. 419,335, filed Oct. 10, 1989, now abandoned.

FIELD OF THE INVENTION

The present invention is related to vapor vent valves for fuel tanks, and particularly to a vent valve which closes when fuel in the tank reaches a "full" level and which is not susceptible to premature closing.

BACKGROUND OF INVENTION

Vehicle fuel tanks are typically filled by way of a one-way fuel inlet admitting fuel under pressure from a pump. As the tank is filled and the fuel level rises, a volume of air and fuel vapor must be removed from the tank to enable the fuel to be pumped into the tank up to the controlled "full" point.

When the vehicle has been in a high engine load condition for a significant time period, the fuel in the tank becomes hot due to the heat that is introduced by the return of surplus fuel from the hot engine and heat input from the vehicle underbody. The high temperature fuel can generate a high vapor pressure condition in the tank and will rapidly evaporate when the fuel cap is removed. To prevent spraying of fuel when the filler cap is removed, and to permit the effective filling of the tank, the vapor in the tank must be removed by way of a valve.

The valve must handle the high vapor and air flow without premature closing.

The venting system thus far described is operative only when the fuel cap is removed. Another venting valve not described in detail herein is used to enable a controlled venting of the fuel tank when the fuel cap is on the vehicle. One preferred venting valve for this purpose is shown in U.S. Pat. No. 4,753,262 assigned to the assignee of this application.

SUMMARY OF THE INVENTION

The present invention is a fuel tank vent valve responsive to the level of fuel in the tank. The valve permits the escape of air and fuel vapor from a tank when the fuel cap is removed and closes only when the fuel level reaches its "full" position. The valve is substantially unaffected by the flow of air and fuel vapor out of the tank and will not close prematurely as fuel is being pumped in.

The valve of the present invention comprises a hollow valve body mounted in the interior of the fuel tank, communicating at one end with the upper end of the filler tube of the tank and having at least one radial port formed in the other end to communicate with the tank interior. A shutter is mounted on the valve body, axially slidable between an open position remote from the radial port or ports allowing air and fuel vapor to flow therethrough and out the tank, and a closed position covering the radial port or ports.

The shutter is moved between the open and closed positions by a float axially slidable on the valve body adjacent the shutter. Because the float and shutter can only move axially with respect to the valve body, and because the air and vapor flow through the port or ports is at right angles to the direction of valve movement, the tendency of the valve to close inadvertently in response to the outbound flow of air and vapor flow is substantially eliminated.

In an illustrated embodiment the float comprises an air chamber opening downwardly towards the fuel in the tank, and is made from a material more dense than the fuel. The float can be separate from the shutter or integrally connected thereto, the latter embodiment assuring that the valve is positively opened as the fuel level drops, even if the surface tension of any fuel trapped between the shutter and valve body tends to hold the shutter in the closed position.

In a preferred embodiment the shutter is provided with drainage holes to allow fuel between the valve body and shutter to drain back into the tank.

Other features and advantages inherent in the present invention will become apparent upon further reading of the specification.

BRIEF DESCRIPTION OF DRAWINGS

FIG. 5 is a cross section of the FIG. 2 structure.

DETAILED DESCRIPTION OF THE ILLUSTRATED EMBODIMENT

Figure 1:
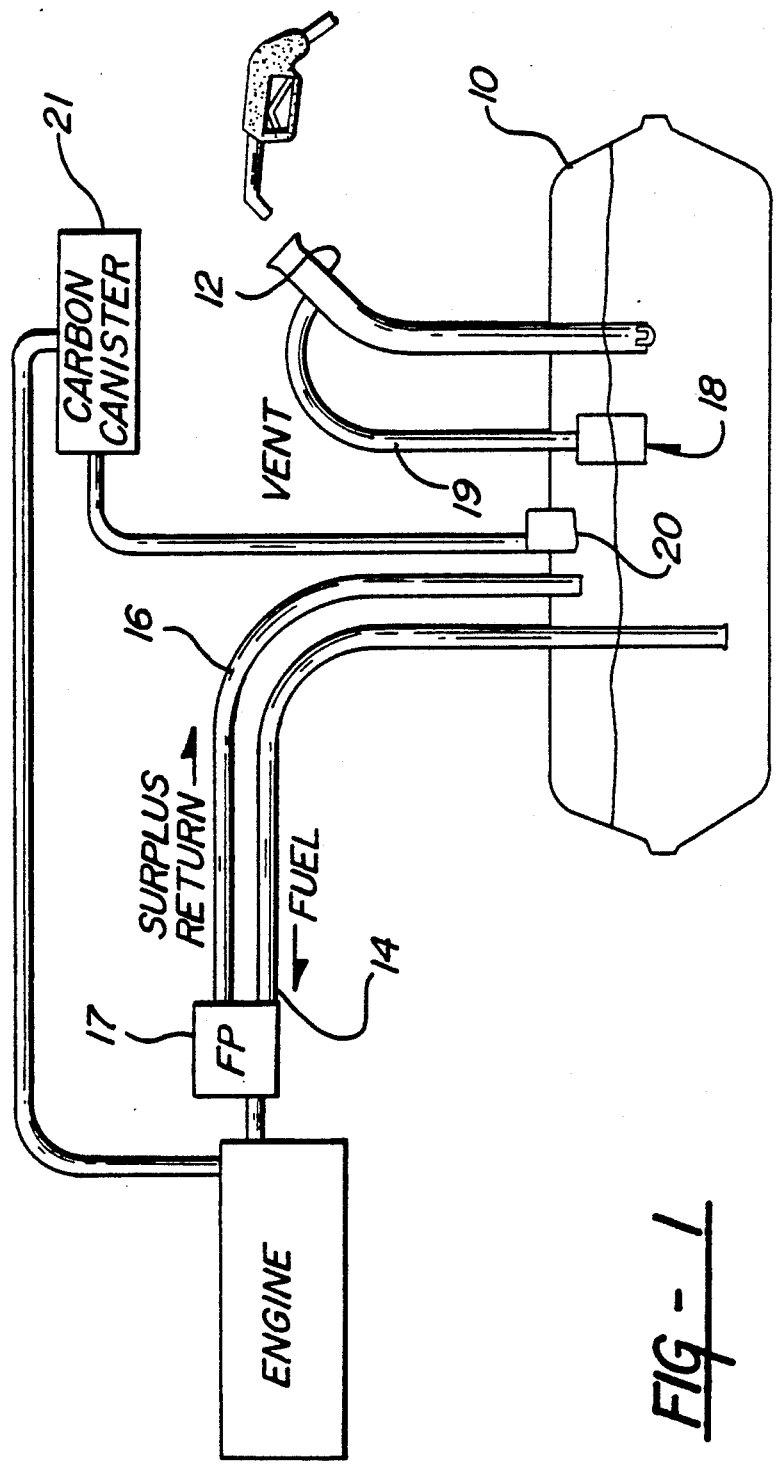
FIG. 1 is a schematic view of a vehicle fuel tank system including a fuel-level responsive vent valve according to the present invention.

Referring to FIG. 1, a vehicle fuel tank 10 is provided with a fill pipe 12 through which fuel is pumped into the tank, an engine fuel intake line 14, and a surplus return line 16. Intake line 14 and surplus line 16 are connected to the fuel pump 17 of the vehicle engine. Fuel tank 10 is further provided with a fuel level responsive vapor vent valve 18 in accordance with the present invention, communicating with the interior and exterior of the fuel tank to vent air and fuel vapor therefrom via vent line 19. In the illustrated embodiment, vent line 19 is connected externally of the tank to the filler pipe 12.

Filling the fuel tank through fill pipe 12 causes the level of fuel in the tank to rise, displacing and pressurizing air and fuel vapor contained in the tank or introduced during the filling process. When the engine is running and filler pipe 12 is closed, surplus fuel heated by its proximity to the engine while in fuel pump 17 is returned via surplus line 16. The return of this heated fuel into the fuel tank also increases the internal vapor pressure of the tank.

Vent valve 20 bleeds air and fuel vapor from the tank 10 to reduce the internal tank pressure, thereby ensuring that the internal tank pressure does not reach an unsafe pressure point. However, when the level of the liquid fuel in the tank nears or reaches valve 20 by tilt or slosh, the valve closes to prevent dangerous leaks of fuel from the tank to the carbon canister 21. Repeated fuel leaks could cause fuel spillage on the ground.

Figure 2:
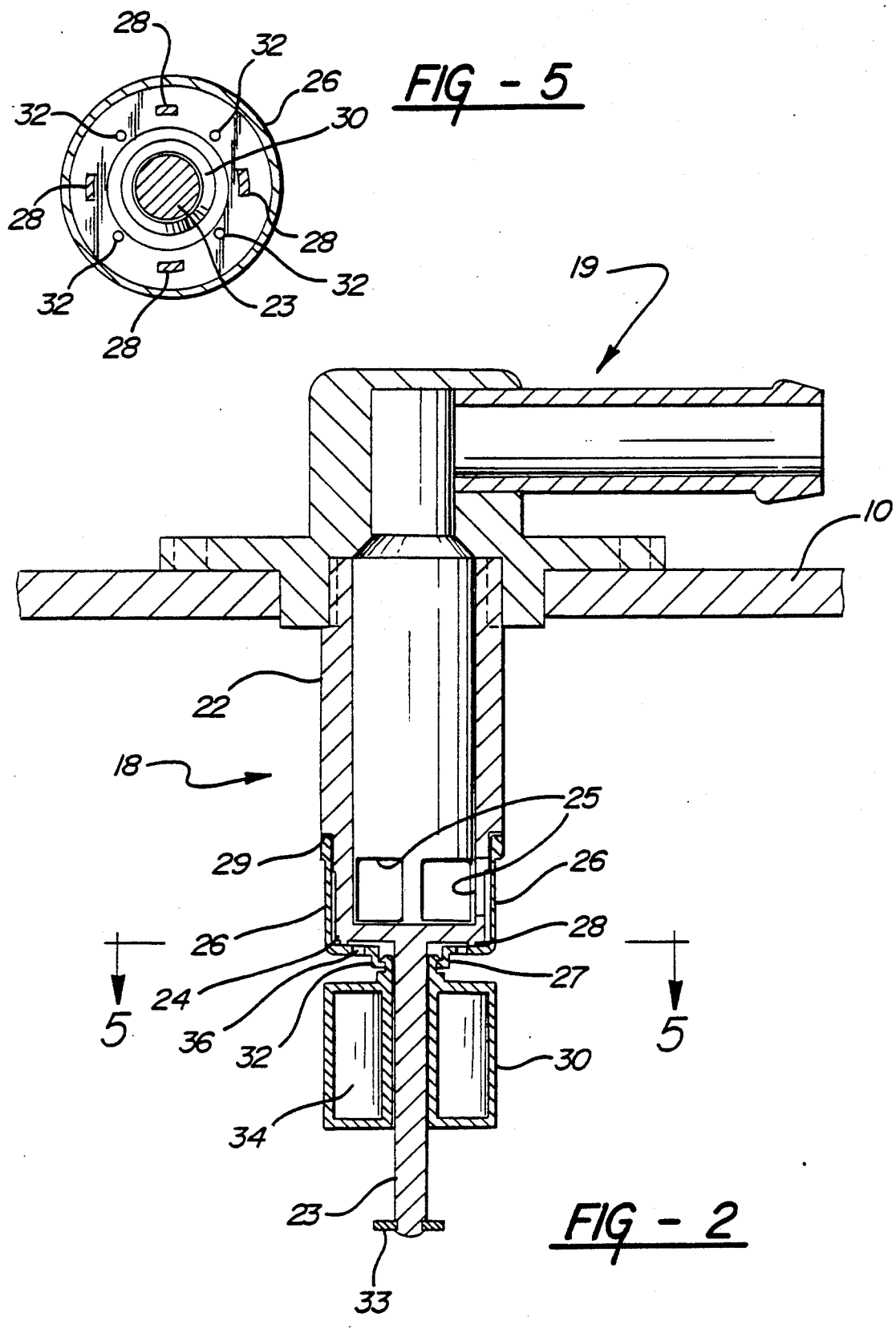
FIG. 2 is a side section view of a fuel vapor vent valve according to one embodiment of the present invention, with the valve in a closed position.
Figure 3:
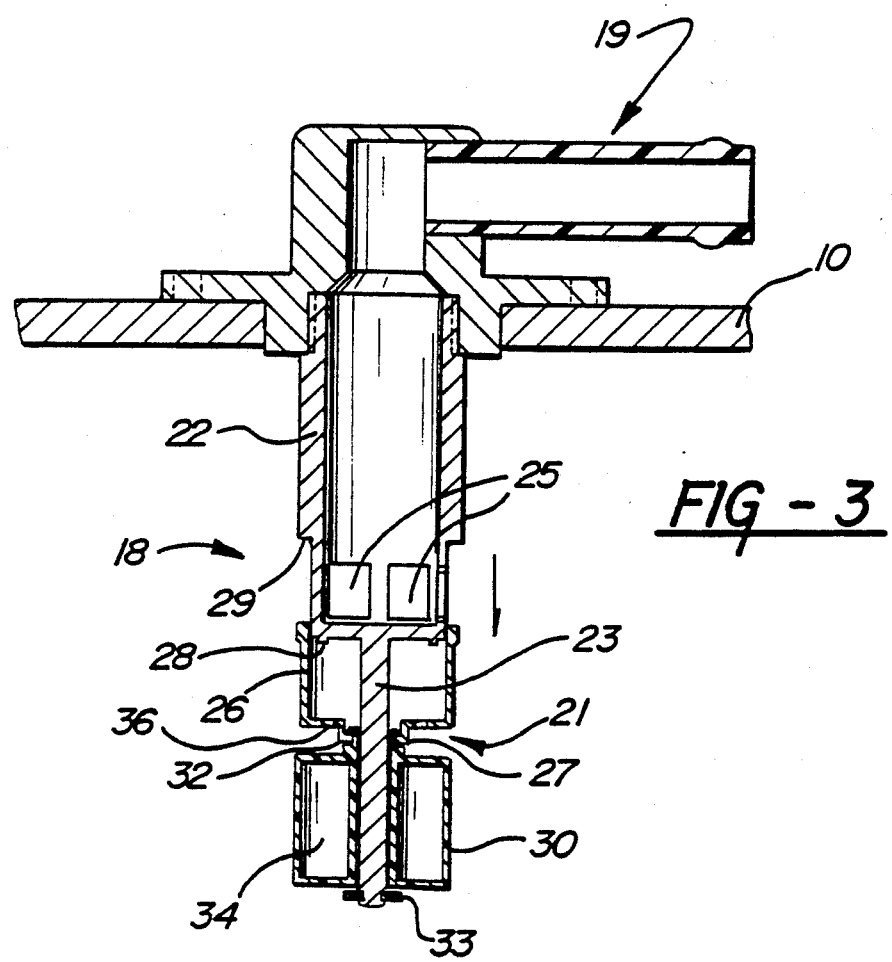
FIG. 3 is a side section view of the fuel vapor vent valve of FIG. 2 in an open position.

Referring now to FIGS. 2, 3 and 5, a vapor vent valve 18 according to the present invention is shown mounted in and depending from the top wall of fuel tank 10. Vent valve 18 comprises a rigid, cylindrical hollow valve body 22 molded from a material such as, but not limited to, acetal resin, and an integral lower axial slide portion 23 depending from the bottom wall 24 of valve body 22. A plurality of radial ports 25 are formed in the lower half of valve body 22, providing communication between the interior of the fuel tank and the interior of valve body 22. At its upper end, valve body 22 opens to vent structure 19 communicating with the filler pipe 12.

In the illustrated embodiment of FIGS. 2, 3 and 5, valve body 22 is essentially circular in cross section. However, it will be understood that valve body 22 may take any suitable cross-sectional shape, for example rectangular.

An annular port-closing shutter 26 is mounted on slide 23 via annular end flange 27 for axial sliding movement between a lower open position shown in FIG. 3, wherein radial ports 24 are unobstructed, and an upper closed position shown in FIG. 2, in which shutter 26 completely covers ports 24. It can be seen that the lower portion of valve body 22 adjacent ports 24 is reduced in diameter with respect to the upper portion of the valve body, permitting shutter 26 to fit essentially flush with the outer wall of the valve body 22 when in the closed position. Annular shoulder 29 provides a seal with respect to the mating annular edge of shutter 26. A second seal is provided by the mating of annular flange 28 and the interior bottom surface of shutter 26.

As clearly shown in FIG. 2, the interior surface of shutter 26 radially inward of annular flange 28 communicates with the interior of the fuel tank via drain holes 36 when the shutter is in the closed position; the remainder of the interior surface of shutter 26 is sealed from the fuel tank interior by the seals formed at flange 28 and shoulder 29, and communicates with the interior of valve body 22 through radial ports 25. Accordingly, the pressure differential between the interior of the fuel tank and the interior of the valve body when shutter 26 is closed is reduced or eliminated across the portion of the shutter radially inward of flange 28. This reduction in shutter surface area across which the pressure differential acts to maintain the shutter closed assists the structure described below in "decorking" the shutter once the fuel level drops.

A float 30, mounted for axial movement on slide 23 below shutter 26, is connected to flange 27 of shutter 28 by way of barbed portions 32 engaging the flange in a snap-fit. Alternately, float 30 and shutter 26 could be molded as an integral unit. The downward travel of the float, and accordingly of the shutter, is limited by a clip or washer 33 mounted on the bottommost portion of axial slide 23.

Float 30 has an air chamber 34 formed therein, opening downwardly toward the fuel and the fuel tank. Although the float 30 is molded from a material more dense than the fuel, the air trapped in the air chamber will cause float 30 to rise as the level of fuel in the tank rises beyond washer 33, lifting shutter 26 upwardly until it engages shoulder 29 on valve body 22. When the fuel level drops, float 30 will follow, pulling shutter 26 downwardly, until it contacts washer 33. The weight of the float material ensures positive opening of the valve as the fuel level drops.

Referring to FIG. 3, valve 18 is open, with the fuel level below washer 33, float 30 resting on the washer and shutter 26 below radial ports 25. In this open position, air and fuel vapor in the tank are free to flow through radial ports 25 and out of the fuel tank via valve body 22 and vent structure 19. Valve 18 remains in this open position as long as the fuel level is below washer 33. It should be noted that, due to the radial nature of ports 25, outbound air and vapor flow is essentially perpendicular to the axial motion of shutter 26 and float 30 and creates no significant force component tending to close the valve.

The weight, shape, and position of the shutter assembly comprising shutter 26 and float 30 is such that it is not raised from the position shown in FIG. 3 by the outflow of air and fuel vapor from the tank interior through radial ports 25. As mentioned above, the direction of air and vapor flow out of the tank is primarily radial with respect to valve 18, due to the location of ports 25 on valve body 22. This radial flow does not affect the axially slidable shutter assembly; i.e., the radial outflow does not effect axial motion of the shutter assembly, eliminating any tendency of the valve to close while the level of fuel in the tank is below washer 33.

Referring again to FIG. 2, the fuel tank has been filled, raising the level of the fuel and shutting off valve 18. As the rising fuel level raises around float 30 resting on washer 33 in the open position of FIG. 3, the float is displaced upwardly along axial slide 23, simultaneously forcing shutter 26 upwardly to cover and seal radial ports 25 in the closed position of FIG. 2. Due to the previously mentioned increase in air and vapor pressure as the tank is filled, closing of radial port 25 by shutter 26 may prevent substantial additional amounts of fuel from being pumped into the tank. Accordingly, the closed position of shutter 26 essentially defines the full or top fuel level in the tank. As shown in FIG. 1, the top level of the fuel is approximately at the ¾ submergence of the float 30.

In the event that fuel becomes trapped between shutter 26 and valve body 22 upon closing, drain holes 36 formed in the bottom wall of shutter 26 ensure that the fuel drains back into the tank.

When the fuel level begins to drop, float 30 responds accordingly, pulling shutter 26 down to open radial ports 25. The dead weight of float 30 ensures positive opening of the valve, overcoming any friction or surface tension between shutter 26 and valve body 22 tending to cause the shutter to stick in its upper, closed position.

Figure 4:
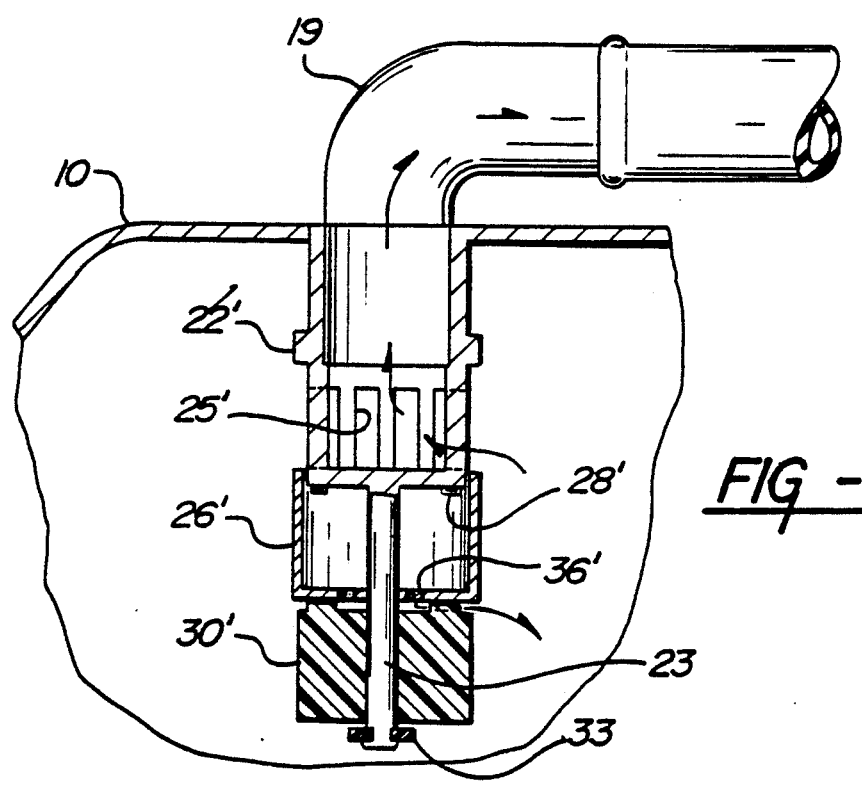
FIG. 4 is a side section view of an alternate embodiment of a fuel vapor vent valve according to the present invention.

FIG. 4 shows an alternate embodiment of the present invention in which float 30' and shutter 26' are not physically connected, and in which float 30' is solidly made from a material less dense than the fuel. As in the embodiment of FIGS. 2 and 3, float 30' and shutter 26' are mounted for axial travel on slide 23 which is integral with body 22'. The drain holes 36' are formed in shutter 26' for the purpose described above. Aside from the fact that shutter 26' may slide on slide 2 independently of float 30', operation is as described above and similar components are given the same reference numbers as were used in FIGS. 2 and 3.

The foregoing description is an illustrated embodiment and is not intended to be limiting, as many variations and modifications lie within the scope of the appended claims.

I claim:

1. A fuel responsive vent valve for venting fuel vapor and air from the fuel tank of the type having a filler tube, said vent valve comprising:
   a hollow valve body mounted within the fuel tank communicating with the upper end of the filler tube;
   radial port means formed in said valve body communicating with the interior of said fuel tank;
   axially slidable shutter means mounted to slide on said valve body between an open position remote from said radial port means and a closed position covering said radial port means;

float means axially slidable on said valve body, said float means responsive to the level of fuel in the fuel tank to raise and lower said shutter means between said open and closed positions;

wherein the valve body defines a first interior surface portion of the shutter means communicating with the interior of the valve body when the shutter means is in the closed position, and a second interior surface portion of the shutter means communicating with the interior of the fuel tank when the shutter means is in the closed position;

wherein the valve body includes an annular shoulder providing a first seal with the shutter means in the closed position, and an annular flange providing a second seal with the shutter means in the closed position, such that the first interior surface portion of the shutter means is defined between the first and second seals.

2. Apparatus as defined in claim 1, wherein the annular shoulder and flange means are formed in the valve body above and below the radial ports means, such that the first interior surface portion of the shutter means is adjacent the radial port means in the closed position.

3. Apparatus as defined in claim 1, wherein the second interior surface portion of the shutter means communicates with the interior of the fuel tank through drainage means formed in the shutter means.

4. Apparatus as defined in claim 3, wherein the annular flange means is located on the valve body radially outward of the drainage means on the shutter means when the shutter means is in the closed position.

* * * * *

UNITED STATES PATENT AND TRADEMARK OFFICE
CERTIFICATE OF CORRECTION

PATENT NO. : 5,062,444
DATED : November 5, 1991
INVENTOR(S) : Rudolph Bergsma It is certified that error appears in the above-identified patent and that said Letters Patent is hereby corrected as shown below:

On title page, item [54] and col. 1, line 1, change "FUEL LEVEL RESPONSIVE VAPOR VENT VALVE" should read --FUEL LEVEL RESPONSIVE VAPOR VENT VALVE WITH POSITIVE OPENING CHARACTERISTICS--

Column 2, line 12, after "tank" add the following:

--When the shutter is closed the shutter means and the valve body divide the interior surface of the shutter into a first portion communicating with the interior of the valve body, and a second portion communicating with the interior of the fuel tank via the drainage holes. Accordingly, the pressure differential between the interior of the fuel tank and the interior of the valve body when the shutter is closed is reduced or eliminated across the second portion of the shutter to assist in opening the shutter when the fuel level drops.--

Signed and Sealed this

Twenty-fourth Day of May, 1994

*Attest:*

BRUCE LEHMAN

*Attesting Officer*      *Commissioner of Patents and Trademarks*